May 18, 1965 W. A. MOAKLEY, JR 3,183,965

HEAT PUMP CONTROL CIRCUIT

Filed Aug. 1, 1961

| UNIT FUNCTION | SWITCH-25 POSITION | THERMOSTAT 41 | | THERMOSTAT 42 | | THERMOSTAT 50 | |
|---|---|---|---|---|---|---|---|
| | | heat | cool | heat | cool | heat | cool |
| OFF | NO CONTACT | — | — | — | — | — | — |
| HI FAN | Y-C | — | — | — | — | — | — |
| HI FAN AUTO | Y-D X-B | F-G | F-E | I-J | I-H | L-M | L-K |
| LO FAN AUTO | Y-D X-A | F-G | F-E | I-J | I-H | L-M | L-K |

*INVENTOR.*
WILLIAM A. MOAKLEY, JR.
*BY* Raymond Curtin
ATTORNEY.

United States Patent Office 3,183,965
Patented May 18, 1965

3,183,965

HEAT PUMP CONTROL CIRCUIT

William A. Moakley, Jr., Syracuse, N.Y., assignor to Carrier Corporation, Syracuse, N.Y., a corporation of Delaware Filed Aug. 1, 1961, Ser. No. 128,480
2 Claims. (Cl. 165—29)

This invention relates to control circuits for air conditioning equipment, more particularly to control circuits for heat pumps employing a compression refrigeration system to selectively heat or cool a conditioned area.

So called "heat pumps" have been evolved in which a compression refrigeration system is arranged to selectively direct refrigerant from the compressor either into heat exchange relationship with the ambient, or a conditioned area, whereby the conditioned area may be either selectively heated or cooled.

In arranging the necessary fan motors, compressor motors, control thermostats, transfer valve solenoids, and switches in a circuit it is desirable that the current requirements of any of the aforementioned circuit components be independent of the requirements of the other components. For purposes of efficiency and economy this permits use of minimum capacity components of minimum cost.

It is with the above problems and desiderata in mind that the present means have been evolved, means permitting the arrangement of circuit components required for efficient automatic heat pump operation in a manner such that the current requirements of any one of these components will not affect the selection of current carrying capacities of the other components.

It is thus a primary object of the invention to provide improved means for arranging the necessary circuit components of a heat pump in operative relationship.

Another object of the invention is to provide means for arranging the components of a heat pump control circuit so as to permit utilization of components of minimum current carrying capacity.

A further object of the invention is to provide control circuit means in which the current requirements of the components do not affect the selection of current carrying capacities of other components.

An additional object of the invention is to provide an improved heat pump control circuit in which there is little danger of component burn-out.

It is also an object to insure the availability of a desired potential drop across each of the circuit components of a heat pump so as to obtain maximum efficiency of operation.

These and other objects of the invention which will become hereafter apparent are achieved by arrangement of the necessary circuit components required to effect desired heat pump control in a circuit in which each of the components is provided with a separate connection across the power supply lines so that the current requirements of any one of the components does not affect the potential drop across the other circuit components.

An important feature of the invention resides in the fact that supplemental resistance heaters may readily be employed by the use of the teachings of this invention without necessitating an increase in current carrying capacities of the circuit components.

Another important feature of the invention is that though separate circuits are provided for the components, common conductors are utilized, thereby reducing costs.

The specific details of a preferred embodiment of the invention, and their mode of functioning will be made most manifest and particularly pointed out in clear, concise and exact terms in conjunction with the accompanying drawings, wherein.

Figures 1, 2:
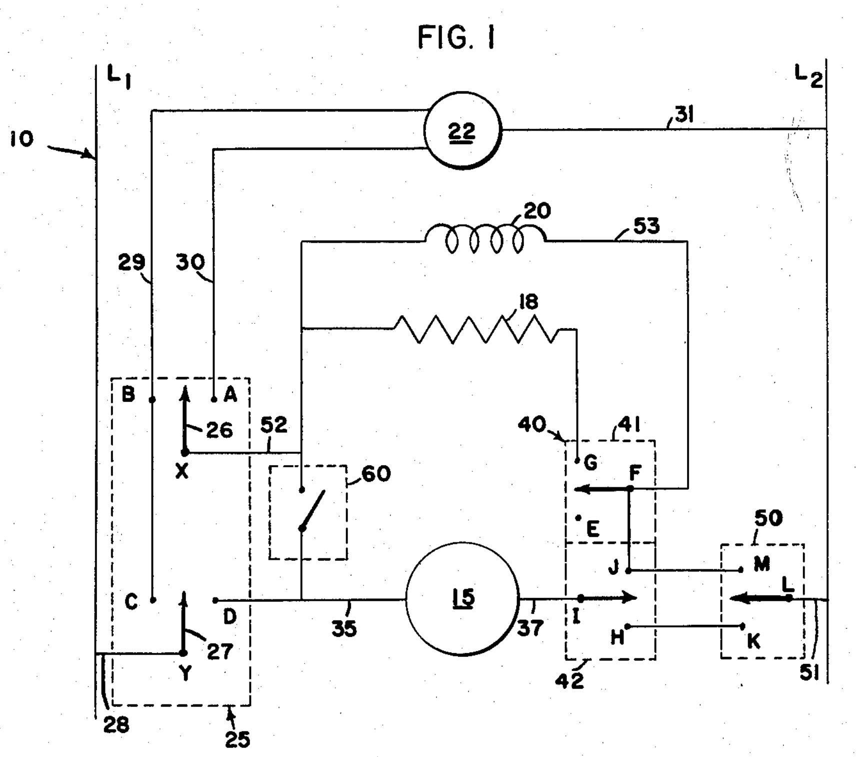
FIGURE 1 represents a schematic circuit diagram illustrating a suggested mode of wiring the necessary electrical components of a heat pump in a circuit permitting automatic operation of the heat pump.
FIGURE 2 is a table illustrating the switch positions for each cycle of operation of the heat pump.

As best seen in the drawing, the circuit 10 is such as to permit energization of the circuit components across power supply line conductors L1 and L2.

The compressor motor 15 utilized for driving the compressor of the compression refrigeration system employed for effecting desired heat changes in the air conditioning system is arranged in the circuit across power supply line conductors L1 and L2, along with a supplemental strip heater 18; the solenoid 20 of the refrigerant flow control valve; and the two speed fan motor 22 employed for creating desired air flow.

A function selector switch 25 is positioned between line L1 and the aforementioned: compressor motor 15, supplemental heater 18 for increasing the heat output of the apparatus under heating cycle operation, valve solenoid 20 and fan motor 22.

Function selector switch 25 in the illustrated embodiment of the invention is formed with terminals A, B, C, D, X and Y. Switch arm 26 is a single-pole double-throw type movable between terminals A and B. Switch arm 27 is similarly of a single-pole double-throw type movable between terminals C and D. Conductor 28 connects line L1 to switch arm 27. Terminal C is coupled to terminal B.

In the fan motor circuit high speed line 29 extends from terminal B to the high speed windings of fan motor 22, while terminal A is connected via low speed line 30 to the low speed windings of fan motor 22. Fan conductor 31 extends between fan motor 22 and power line L2.

Extending from terminal D of the selector switch 25 to compressor 15 is compressor line 35. Conductor 37 extends from compressor 15 to terminal I of two stage heating cooling thermostat 40, which is connected through on-off thermostat 50 via conductor 51 to line L2.

Two stage thermostat 40 is formed with stage 41 provided with contacts E, F, and G; and second stage 42 provided with contacts H, I and J. Contact J is electrically coupled to contact F.

On-off thermostat 50 is formed with contacts K, L and M, contact K being electrically coupled to contact H, and contact M being electrically coupled to contact J, as seen in the drawing.

The thermostats 40 and 50 are such that a circuit is always made between at least two of the contacts. Thus in stage 41 of thermostat 40 a circuit is made alternatively between contacts F and G or F and E. In stage 42 of thermostat 40, a circuit is made alternatively between contacts I and J or I and H. Similarly in on-off thermostat 50 the circuit is made alternatively between contacts L and M or L and K.

The solenoid 20, employed for actuating the well-known four-way reversing valve controlling the flow of refrigerant from the compressor to obtain the reverse cycle operation, is arranged in a ciruit between terminal X of selector switch 25 and contact F of thermostat 40. Conductor 52 extends from terminal X to the solenoid 20, and conductor 53 extends from the solenoid to contacts F and J and M.

Arranged between conductor 52 and contact G of thermostat 40 is the supplementary heating element 18, which is a conventional electrical heater commonly referred to as a strip heater.

A defrost thermostat 60 is positioned across lines 52 and 35 as viewed in the drawing, to regulate the defrosting action of the apparatus.

*Operation*

The aforedisclosed circuit arrangement functions to permit a selection of desired modes of operation for a heat pump. Thus the heat pump may be employed for ventilation purposes by energizing only the fan motor to provide for a desired movement of air in the conditioned area; or the selector switch 25 may be arranged to provide for automatic heating or cooling with either high fan speeds or low fan speeds.

Where only ventilation is desired, the function selector switch 25 is set so that switch arm 27 closes the circuit to terminal C. Switch arm 26 is maintained in its neutral position. It will be observed that a circuit is then completed from power line conductor L1 through conductor 28, switch arm 27, terminals C and B, line 29 across the fan motor, through fan conductor 31 to power line conductor L2. This completed circuit energizes the high speed winding of fan motor 22 to effect the desired movement of air. It will be observed that none of the current employed for energizing the fan motor passes through the compressor motor 15, strip heater 18, or valve solenoid 20. Thus the potential drop across the fan motor is substantially equal to the potential difference between conductors L1 and L2, assuming negligible conductor resistance between lines L1 and L2.

When it is desired to utilize the equipment to control heating and/or cooling of the conditioned area, in addition to ventilation, the selector switch is set for automatic operation. This automatic setting may provide either high speed fan operation, or low speed fan operation, as desired by the user.

For high speed fan operation and automatic heating and cooling, the selector switch is set so that switch arm 27 closes the circuit between terminals Y and D; and switch arm 26 completes the circuit between terminals X and B. In the illustrated embodiment of the invention, the valve solenoid 20 is energized when it is desired to obtain heating of the conditioned area. It will be understood by those skilled in the art that upon energization of the valve solenoid, the four-way valve of the refrigeration system is moved to a position causing the heat exchangers located in the conditioned area to function as a heat dissipating refrigerant condenser. Assuming ambient conditions such that it is desired to heat the conditioned area, and such as not to require defrosting of the refrigeration system heat exchangers, thermostat stage 41 will have a circuit completed through contacts F and G; thermostat stage 42 will have its circuit completed through contacts I and J and thermostat 50 will have its circuit completed through contacts L and M. Under these circumstances, it will be observed that the compressor 15 is energized through conductor 28, switch arm 27, compressor line 35, across compressor motor 15 through conductor 37 across contacts I and J, M and L, and conductor 51 to power line conductor L2.

The strip heater 18 is connected across power line conductors L1 and L2 via conductor 28, switch arm 27, defrost thermostat 60, contacts G and F, contacts M and L, and conductor 51. It will be noted that only where the circuit through contacts F and G is made and the defrost thermostat is closed will the strip heater be energized.

The transfer or reversing valve solenoid 20 is arranged in a circuit across the power line conductors L1 and L2 which is formed by conductor 28, switch arm 27, defrost thermostat 60, conductor 53, contacts M and L of thermostat 50, and conductor 51. It will be noted that the valve solenoid 20 is only energized when the defrost thermostat is closed and contacts M and L are connected. Thus in the illustrated embodiment of the invention, during heating operation, the defrost thermostat 60 will be closed, and the valve solenoid 20 will be energized so as to cause the four-way valve to which it is coupled to direct the condensing refrigerant into heat exchange relationship with the conditioned area.

The fan motor 22 is energized, as described in connection with ventilation operation.

When in the automatic cycle, low speed fan operation is desired, it is merely necessary to set the selector switch 25 so that switch arm 26 completes the circuit between terminals X and A. The other components will be energized as aforedescribed.

In the automatic setting of the selector switch 25, as the temperature rises to a point requiring cooling of the conditioned area, a circuit is made through contacts I and H of thermostat stage 42, and through contacts L and K of thermostat 50. No circuit will be made through thermostat stage 41, it being understood that closing contacts F and E results in a non-circuit making condition. The defrost thermostat 60 will remain closed.

Under these circumstances, the compressor motor 15 will be energized via conductor 28, switch arm 27, lines 35 and 37, contacts I and H, contacts K and L, and conductor 51. The fan motor will be energized as aforedescribed either at low or high speed. The valve solenoid 20 and strip heater 18 will remain deenergized, and as will be understood, the compressed refrigerant will be directed from the compressor into heat exchange relationship with the ambient.

The various thermostats and thermostat stages are designed so that upon a predetermined reduction in temperature of the air in the conditioned area, thermostat 50 is actuated so that the circuit through contacts K and L is interrupted and connection between contacts L and M established. Compressor operation is terminated and the fan continues to operate at either high or low speed depending upon the position of switch arm 26. A continued reduction in the air temperature to a predetermined level causes thermostat stage 42 to operate to establish a circuit between contacts I and J, interrupting the connection between contacts H and I. Under these circumstances the compressor is re-activated, and with the solenoid controlling the reversing valve, having been energized by the action of thermostat 50, operation under the heating cycle ensues.

A still further reduction in temperature to a predetermined lower level causes thermostat stage 41 to complete a circuit through contacts F and G, energizing the strip heater 18 to increase the heat output of the unit.

Eventually it may be necessary to defrost the outdoor coil of the heat pump during heating cycle operation. Such action is accomplished by opening the defrost thermostat in response to an operating characteristic of the system indicating a need for defrost. Such controls are well known in the refrigeration field and it is not believed necessary to have an understanding of this invention to describe in detail such a control.

Interruption of the circuit through the defrost thermostat deenergizes the coil of the solenoid governing the reversing valve, automatically establishing temporary cooling cycle operation for the purpose of feeding hot compressed gas directly to the outdoor coil. Termination of the defrosting action will be effected by the defrost control which re-establishes heating cycle operation as the thermostat 60 closes.

It will be readily appreciated that with the control circuit described the selector switch regulates the fan operation independently of the defrost thermostat so that upon the opening of the defrost thermostat the fan motor is not in series with either the solenoid 20 or the heater 18, although inactive during defrost operation.

It is thus seen that a simple circuit has been provided in which the necessary circuit components such as a compressor motor 15, a strip heater 18, a valve solenoid 20 and a fan motor 22 may be arranged across the conductors L1 and L2 of a power supply line so that the potential drop across each of the aforementioned components is substantially equal to the potential difference between the conductors L1 and L2, thereby providing for maximum efficiency of operation of the components, and preventing component burn-out.

The above disclosure has been given by way of illustration and elucidation, and not by way of limitation, and it is desired to protect all embodiments of the herein disclosed inventive concept within the scope of the appended claims.

I claim:

1. A control circuit for a heat pump including a refrigeration system having a compressor, heat transfer members, fan control means for passing air to be either heated or cooled over the heat transfer members, and a reversing valve including a solenoid coil controlling flow of refrigerant from the compressor selectively to the heat transfer members; said circuit comprising: a selector switch including a first control arm operable to complete a circuit through said fan means or said compressor selectively, and a second control arm electrically independent of said first control arm for completing a circuit through said fan control means when said first control arm is positioned to complete a circuit through said compressor; a normally closed defrost switch in series with said second control arm of the selector switch and with said reversing valve solenoid coil, said normally closed switch being in series with said first switch arm of the selector switch and adapted to open in response to a condition indicating need for defrosting one of the heat transfer members to interrupt the circuit through the fan control means.

2. In a control circuit for an air conditioning unit employing a reverse cycle refrigeration system including a motor driven compressor, heat transfer members, fan means including a motor associated with the heat transfer members, a solenoid controlled refrigerant flow reversing valve for interchanging the heat transfer functions of the heat transfer members and supplementary heating means for elevating the heat output of the unit during heating cycle operation, a source of electric energy, a selector switch having a first set of contacts in series with the compressor motor and in series with the solenoid and with the supplementary heaters and the motor controlling said fan means, a defrost thermostat controlled switch interposed in the control circuit in parallel with the compressor and in series with the fan means motor, supplementary heater and solenoid respectively, said selector switch having a second pair of contacts interposed in series between the defrost thermostat controlled switch and the fan means motor, thermal responsive switches in series with said solenoid, supplementary heaters and compressor for controlling their operation in response to the thermal requirement of the area served by the unit whereby said air conditioning unit may be automatically operated to either heat or cool air flowing within the area.

References Cited by the Examiner

UNITED STATES PATENTS

| | | | |
|---|---|---|---|
| 2,672,734 | 3/54 | Ditzler | 62—160 |
| 2,902,220 | 9/59 | Myck | 257—290 |
| 2,969,959 | 1/61 | Kuhn | 62—160 |
| 3,006,613 | 10/61 | Coyne | 165—29 |

CHARLES SUKALO, *Primary Examiner.*

WILLIAM J. WYE, ROBERT A. O'LEARY, *Examiners.*